United States Patent [19]

Hattori et al.

[11] 4,114,578
[45] Sep. 19, 1978

[54] AIR-TO-FUEL RATIO CONTROL SYSTEM

[75] Inventors: Tadashi Hattori, Okazaki; Takamichi Nakase, Gamagori; Tokio Kohama, Nishio, all of Japan

[73] Assignee: Nippon Soken, Inc., Nishio, Japan

[21] Appl. No.: 796,225

[22] Filed: May 12, 1977

[30] Foreign Application Priority Data

May 28, 1976 [JP] Japan .................................. 51-62543

[51] Int. Cl.² .................. F02M 23/04; F02M 7/12
[52] U.S. Cl. .................. 123/124 R; 123/119 EC; 123/119 D; 123/124 B
[58] Field of Search ........... 123/124 R, 124 A, 124 B, 123/119 D, 119 DB, 97 B, 119 EC, 32 EE

[56] References Cited

U.S. PATENT DOCUMENTS

| | | | |
|---|---|---|---|
| 3,866,588 | 2/1975 | Nakada et al. | 123/119 D |
| 4,010,722 | 3/1977 | Laprade et al | 123/119 D |
| 4,015,568 | 4/1977 | Horiye et al. | 123/124 R |
| 4,046,120 | 9/1977 | Laprade et al. | 123/119 EC X |
| 4,052,968 | 10/1977 | Hattori et al. | 123/119 EC |
| 4,062,337 | 12/1977 | Rivere | 123/124 B |

FOREIGN PATENT DOCUMENTS 2,315,003   1/1977   France .................................. 123/124 B
2,315,004   1/1977   France .................................. 123/119 D Primary Examiner—Wendell E. Burns
Attorney, Agent, or Firm—Cushman, Darby & Cushman

[57] ABSTRACT

An air-to-fuel ratio control system, for properly supplying additional air through an additional air passage to the intake port of the internal combustion engine depending on a detected air-to-fuel ratio of the mixture, includes a drive unit having two main pressure chambers divided by a main diaphragm and an auxiliary pressure chamber separated by an auxiliary diaphragm from one of the main chambers. The main and auxiliary diaphragms are connected by a rod to a bypass valve mounted in the additional air passage to increase or decrease the passage area by the movement of the bypass valve. In response to an air-to-fuel ratio detection signal, the intake port vacuum (or the atmosphere) is introduced to either one of the main chamber while the other chamber is occupied with the atmosphere or the intake port vacuum thereby to produce a pressure difference between the two main chambers. Since the third pressure chamber is normally occupied with the intake port vacuum, the movement of the bypass valve is biased in a direction to decrease the passage area of the additional air thereby to eliminate the adverse effect of the variation in the intake port vacuum.

3 Claims, 7 Drawing Figures

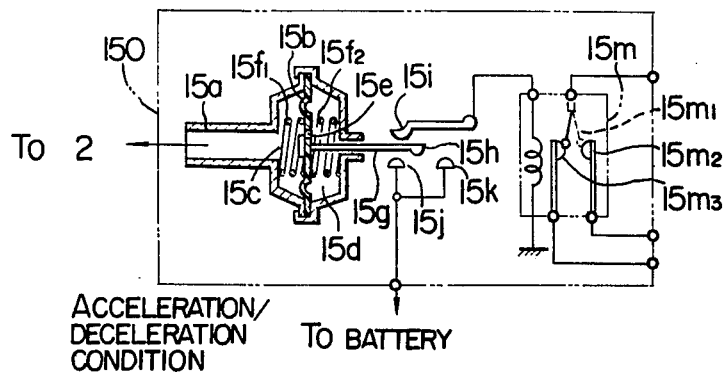
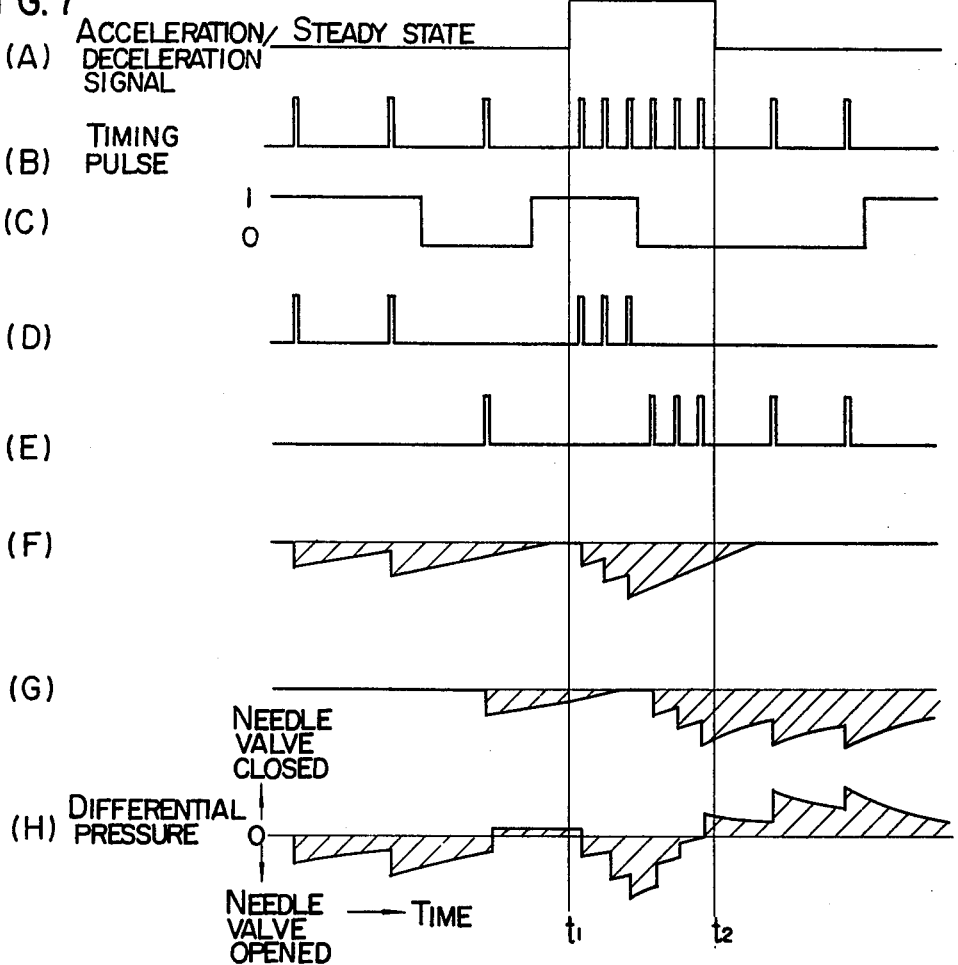

AIR-TO-FUEL RATIO CONTROL SYSTEM

The present invention relates to air-to-fuel ratio control systems for controlling the air-to-fuel ratio of the mixtures supplied to an internal combustion engine, and more particularly the invention relates to such control system which controls the air-to-fuel ratio by supplying additional air.

To obtain a maximum efficiency of modified engines which have been proposed for automobile exhaust emission control purposes or to ensure an optimum purification of exhaust gases by the exhaust gas purifying catalytic converters which have been used on engines for the same exhaust emission control purposes, the air-to-fuel ratio of the mixtures supplied to the engine must always be controlled properly.

To meet this requirement, a type of system has been proposed in which the oxygen content of the exhaust gasses from an engine is detected and applied to a control unit which in turn discriminates the air-to-fuel ratio of the mixture, and the passage area of an additional air passage or the amount of additional air is varied by a bypass valve, thus controlling the air-to-fuel ratio at a predetermined value. With this type of system, it has been the general practice to compensate the air-to-fuel ratio by supplying additional air into the intake manifold downstream of the throttle valve.

The problem with supplying additional air into the intake manifold downstream of the throttle valve is that the amount of additional air is affected greatly by the intake manifold vacuum. Namely, since the manifold vacuum is high during low load operation of the engine and since the manifold vacuum is low during high load operation of the engine, the required compensation cannot be provided unless the opening of the butterfly valve is decreased greatly during low load operation and increased greatly during high load operation. Thus, with the prior art system, during a transient condition of the engine, e.g., a transient period from the low load to the high load operation of the engine, the opening of the bypass valve is held small and the air-to-fuel ratio becomes smaller than a predetermined ratio thus continuously supplying a rich mixture, whereas when the engine comes into the low load operation from the high load operation, the opening of the bypass valve is held large and the air-to-fuel ratio becomes greater than the predetermined ratio thus continuously supplying a lean mixture. Hence, the air-to-fuel ratio swings greatly on both sides of the predetermined ratio thus increasing the control range of air-to-fuel ratio and thereby failing to ensure a full display of the purifying function of the catalytic converter, and moreover if the system is incorporated in an automobile engine, a surging phenomenon is caused during the running of the automobile thus deteriorating the drivability.

Another disadvantage is that while an internal combustion engine is usually operated throughout a wide range of operating conditions ranging from the low rotational speeds to the high rotational speeds, presently this fact is not considered much and it is thus difficult to always satisfactorily control the amount of additional air throughout a wide range of engine operating conditions.

The present invention has been made in view of these circumstances, and it is the object of this invention to provide an air-to-fuel ratio control system which is simple in construction and capable of controlling the amount of additional air to suit various operating conditions of an internal combustion engine without being affected by the intake manifold vacuum.

The system of this invention has among its great advantages the fact that a diaphragm drive unit is used to operate a bypass valve with the result that with a simple construction, the effect of the intake manifold vacuum can be eliminated and the amount of additional air can be satisfactorily compensated in accordance with the output signal of a gas detector, thus greatly reducing variation in the air-to-fuel ratio of the mixtures and thereby ensuring operation of the exhaust gas purifying catalytic converter of the engine with greater efficiency. Another advantage of the system of this invention is that the occurrence of surging phenomenon during the running of a vehicle can be eliminated, thus ensuring improved drivability.

Still another advantage is that the rate of compensation of the additional air can be varied in accordance with the operating conditions of an engine, whereby the amount of additional air can be properly controlled throughout a wide range of engine operating conditions, e.g., from the low speed operation to the high speed operation as well as during the periods of both steady state conditions and transient conditions, and moreover there is the effect of preventing the air-to-fuel ratio from being varied greatly and thereby maintaining the control range of air-to-fuel ratio small.

The above and other objects, features and advantages of this invention will be more apparent from the following detailed description taken in conjunction with the accompanying drawings.

FIG. 6 is a schematic diagram showing the construction of the acceleration/deceleration switch shown in FIG. 5.

FIG. 7 is a waveform diagram useful for explaining the operation of the control unit shown in FIG. 5.

The present invention will now be described in greater detail with reference to the illustrated embodiments.

Figure 1:
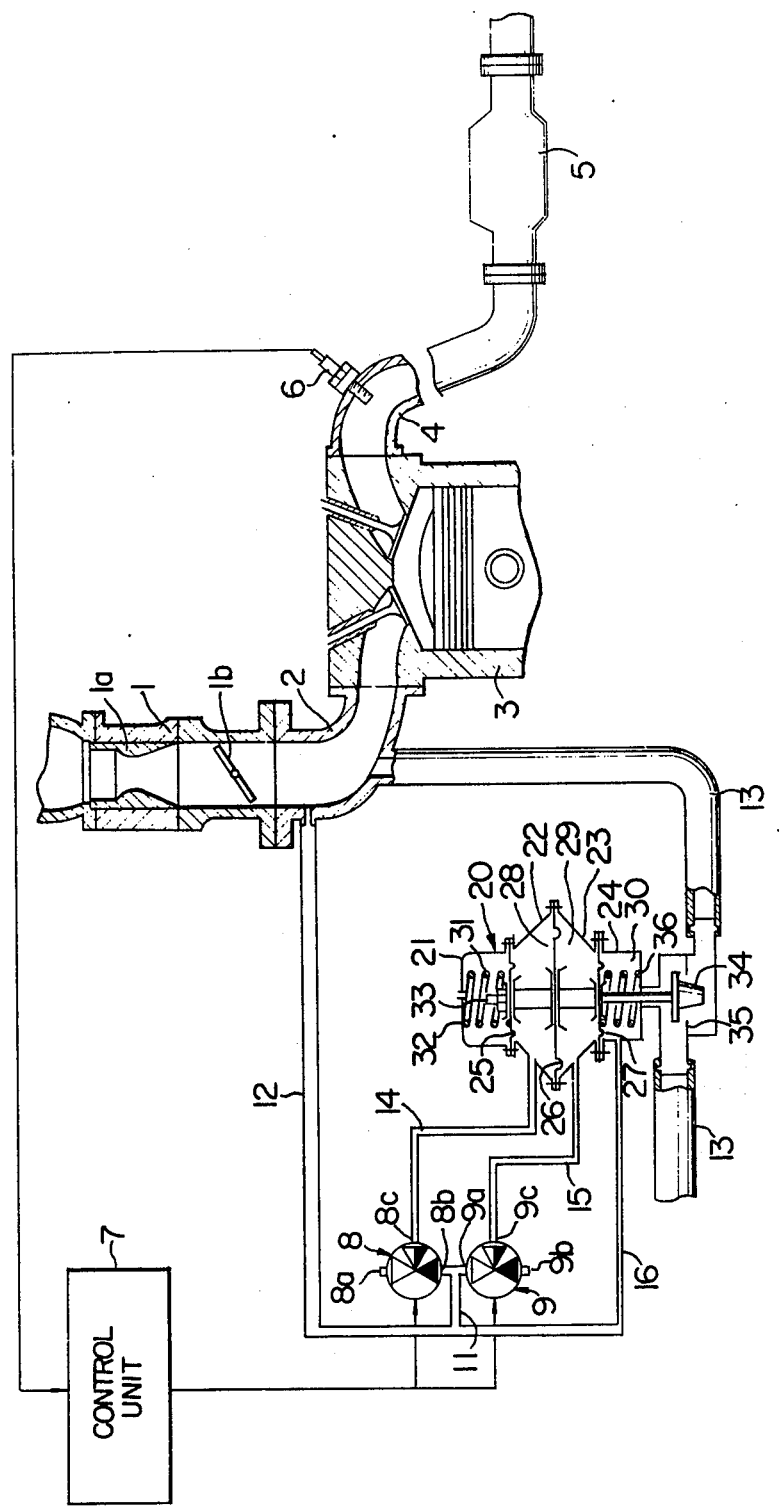
FIG. 1 is a schematic diagram showing an embodiment of the invention.
Figure 2:
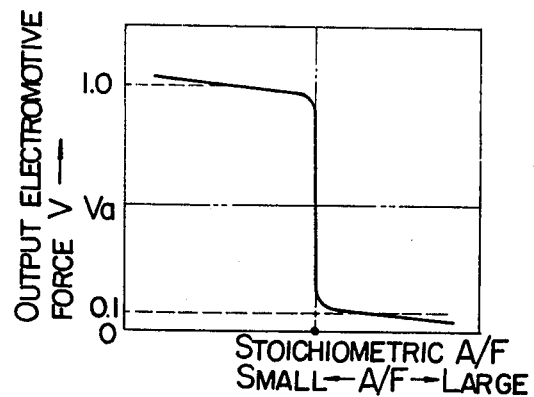
FIG. 2 is an output characteristic diagram of the gas detector shown in FIG. 1.

Referring to FIG. 1 schematically showing an embodiment of the invention, numeral 1 designates an ordinary down-draft carburetor for producing a mixture of air and fuel, and it comprises a venturi 1a and a throttle valve 1b adapted to be operated as desired for adjusting the amount of intake air. The carburetor 1 has been adjusted to produce an air-fuel mixture which is slightly rich in fuel as compared with a desired air-to-fuel ratio. Numeral 2 designates an intake manifold for supplying the mixture produced in the carburetor 1 to an internal combustion engine 3, 4 an exhaust manifold for discharging the exhaust gases from the engine 3, 5 a catalytic converter mounted in the downstream portion of the exhaust manifold 4. In this embodiment, the engine 3 is an ordinary four-cycle reciprocating gasoline engine or LP gas engine. Disposed in the exhaust manifold 4 is a gas detector 6 employing a metal oxide, e.g., zirconium dioxide or titanium dioxide for detecting the concentration of oxygen in exhaust gases and thereby detecting the air-to-fuel ratio of the mixture to generate an output signal corresponding to the air-to-fuel ratio of the mixture. In the case of the gas detector 6 employing zirconium dioxide, as shown in FIG. 2, the gas detector 6 generates an electromotive force of about 1V when the mixture supplied is richer than the stoichiometric air-to-fuel ratio, whereas an electromotive force of about 100 mV is generated when the mixture supplied is leaner than the stoichiometric ratio, thus causing its output electromotive force to change in a stepwise manner at around the stoichiometric air-to-fuel ratio. The output signal of the gas detector 6 is applied to a control unit 7, and three-way electromagnetic valves 8 and 9 are operated in response to the output of the control unit 7.

Figure 3:
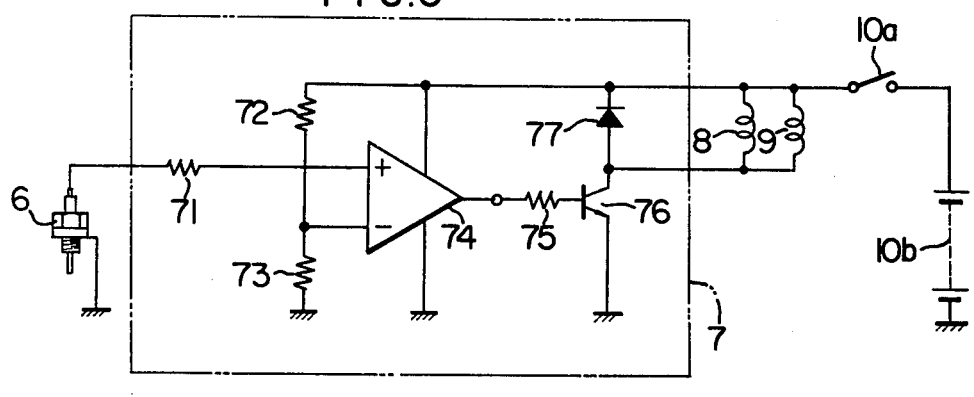
FIG. 3 is a circuit diagram of the control unit shown in FIG. 1.

As shown in FIG. 3, the control unit 7 comprises a voltage comparison circuit including an input resistor 71, voltage dividing resistors 72 and 73 and a differential operational amplifier 74 (hereinafter referred to as an OP AMP), and a switching circuit including an input resistor 75, a transistor 76 and a back electromotive force absorbing diode 77, whereby the magnitude of the output electromotive force of the gas detector 6 is discriminated to control the flow of current to the exciting coils of the three-way electromagnetic valves 8 and 9. The control unit 7 and the three-way electromagnetic valves 8 and 9 are supplied with power from a DC power source 10b through a switch 10a which is operatively associated with the ignition key switch of the engine 3.

The electromagnetic valves 8 and 9 respectively comprise input ports 8a, 8b and 9a, 9b and output ports 8c and 9c and are of the ordinary type so that either one of the input ports is communicated with the output port in response to the energization and deenergization of the exciting coil. The input ports 8a and 9b are opened to the atmosphere, and the input ports 8b and 9a are communicated through pipes 11 and 12 with the intake manifold 2.

Numeral 13 designates an additional air passage for supplying additional air, whose one end is opened into the intake manifold 2 downstream of the throttle valve 1b and other end is opened into the air filter which is not shown. A drive unit 20 is so designed that a bypass valve 34 for varying the passage area of the additional air passage 13 is operated to control the amount of additional air in accordance with various pressure signals. The drive unit 20 comprises four casings 21, 22, 23 and 24 and four pressure chambers 28, 29, 30 and 31 which are respectively defined by a main diaphragm 26 and auxiliary diaphragms 25 and 27, and the first and second pressure chambers 28 and 29 are separated from each other by the main diaphragm 26. The first pressure chamber 28 is communicated through a pipe 14 with the output port 8c of the three-way electromagnetic valve 8, the second pressure chamber 29 is communicated through a pipe 15 with the output port 9c of the three-way electromagnetic valve 9, the third pressure chamber 30 is communicated with the intake manifold 2 through the pipes 12 and 16, and the fourth pressure chamber 31 is opened to the atmosphere. Springs 32 and 36 are respectively disposed in the third and fourth pressure chambers 30 and 31. The main and auxiliary diaphragms 26, 25 and 27 are connected with one another by a shaft 33 so as to be operatively associated with one another, and the pressure receiving area of the main diaphragm 26 is made greater than the auxiliary diaphragms 25 and 27. Mounted at the forward end of the shaft 33 is the bypass valve 34 comprising a needle valve, and the portion of the casing 24 forming the additional air passage 13 is provided with a valve seat 35 which in turn forms a variable orifice along with the bypass valve 34.

Preferably the setting of the drive unit 20 is so adjusted that with no pressure difference between the pressure chambers 28 and 29, the bypass valve 34 is fully opened by the pressure introduced into the third pressure chamber 30 when the throttle valve 1b is in its fully opened position, whereas when the throttle valve 1b is in its fully closed position (during the idling operation, i.e., the intake manifold vacuum is between 400 and 500 mmHg) the bypass valve 34 is fully closed by the pressure introduced into the third pressure chamber 30.

Thus, the control unit 7, the three-way electromagnetic valves 8 and 9 and the pipes 12, 14 and 15 constitute a regulator unit which regulates the pressure in the first and second pressure chambers 28 and 29 of the drive unit 20 in accordance with the output signal of the gas detector 6.

With the construction described above, the regular main air is mixed with the corresponding amount of fuel in the carburetor 1, supplied to the engine 3 through the intake manifold 2, burned in the engine 3 and then discharged to the atmosphere through the exhaust manifold 4, the catalytic converter 5 and the muffler which is not shown.

The gas detector 6 is designed so that it detects a constituent of the exhaust gases to detect the air-to-fuel ratio of the mixture which is closely correlated with the exhaust gas constituent and thereby generate an electric signal corresponding to the detected air-to-fuel ratio. This electric signal is applied to the control unit 7 and compared with a preset level determined by the voltage dividing resistors 72 and 73 (i.e., the voltage equal to the electromotive force produced by the gas detector 6 at around the stoichiometric air-to-fuel ratio).

Consequently, when the output of the gas detector 6 is higher than the preset level, the OP AMP 74 generates a "1" level signal and determines that the mixture is richer than the stoichiometric air-to-fuel ratio, whereas when the detector output is lower than the preset level the OP AMP 74 generates a "0" level signal and determines that the mixture is leaner than the stoichiometric air-to-fuel ratio.

When the mixture is richer, the transistor 76 is turned on in response to a "1" level signal from the OP AMP 74, the thus the exciting coils of the three-way electromagnetic valves 8 and 9 are energized. As a result, the input port 8b of the three-way electromagnetic valve 8 is communicated with its output port 8c and the input port 9b of the three-way electromagnetic valve 9 is communicated with its output port 9c, with the result that the intake manifold vacuum is introduced into the first pressure chamber 28 of the drive unit 20 and the atmospheric pressure is introduced into the second pressure chamber 29. Consequently, in response to the difference in pressure between the first and second pressure chambers 28 and 29 the main diaphragm 26 is displaced so that the bypass valve 34 is moved upward in the Figure and opened in response to the displacement of the main diaphragm 26, thus increasing the amount of additional air and thereby leaning out the mixture.

On the contrary, when the mixture is leaner, the transistor 76 is turned off by a "0" level signal from the OP AMP 74, and thus the exciting coils of the three-way electromagnetic valves 8 and 9 are deenergized. Consequently, the input port 8a of the three-way electromagnetic valve 8 is communicated with its output port 8c and the input port 9a of the three-way electromagnetic valve 9 is communicated with its output port 9c, with the result that the atmospheric pressure is introduced into the first pressure chamber 28 of the drive unit 20 and the intake manifold vacuum is introduced into the second pressure chamber 29. As a result, the bypass valve 34 is displaced downward in the Figure by the action of the main diaphragm 26, that is, the bypass valve 34 is displaced in a direction which closes it, thus decreasing the amount of additional air and thereby enriching the mixture. In this way, the air-to-fuel ratio of the mixture is controlled to attain the stoichiometric ratio.

On the other hand, when the load on the engine 3 is changed so that the intake manifold vacuum is changed, due to the fact that the atmospheric pressure exists on the air filter side of the additional air passage 13 and this pressure can be considered substantially constant, variation of the intake manifold pressure introduced into the additional air passage 13 causes variation of the differential pressure across the variable orifice formed by the bypass valve 34 and the valve seat 35, thus causing the amount of additional air to vary even if the opening of the bypass valve 34 remains unchanged. According to the invention, however, the intake manifold vacuum is introduced into the third pressure chamber 30 of the drive unit 20, and consequently the bypass valve 34 is slightly moved in response to the intake manifold vacuum, thus adjusting the opening of the bypass valve 34.

Figure 4:
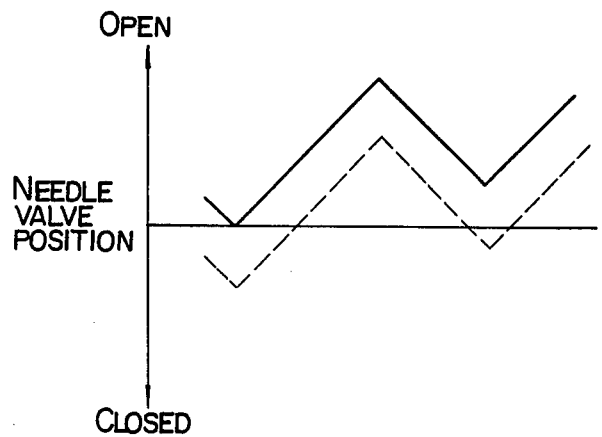
FIG. 4 is a graph useful for explaining the operation of the bypass valve shown in FIG. 1.

In other words, when the intake manifold vacuum increases as during the periods of low load operation thus tending to increase the amount of additional air, the opening of the bypass valve 34 is changed on the whole in the direction which closes it, with the result that the valve opening which has previously been changed as shown by the solid line in FIG. 4 is now changed as shown by the dotted line, thus eliminating the effect of the intake manifold vacuum on the amount of additional air and thereby properly controlling the mixture by means of the additional air.

Of course, the rate of change of pressure in the first and second pressure chambers 28 and 29, respectively, is dependent on the effective area of the inlet of the pressure chamber and the volume of the chamber, and it is preferable to design these chambers to suit the type of the engine used.

Figure 5:
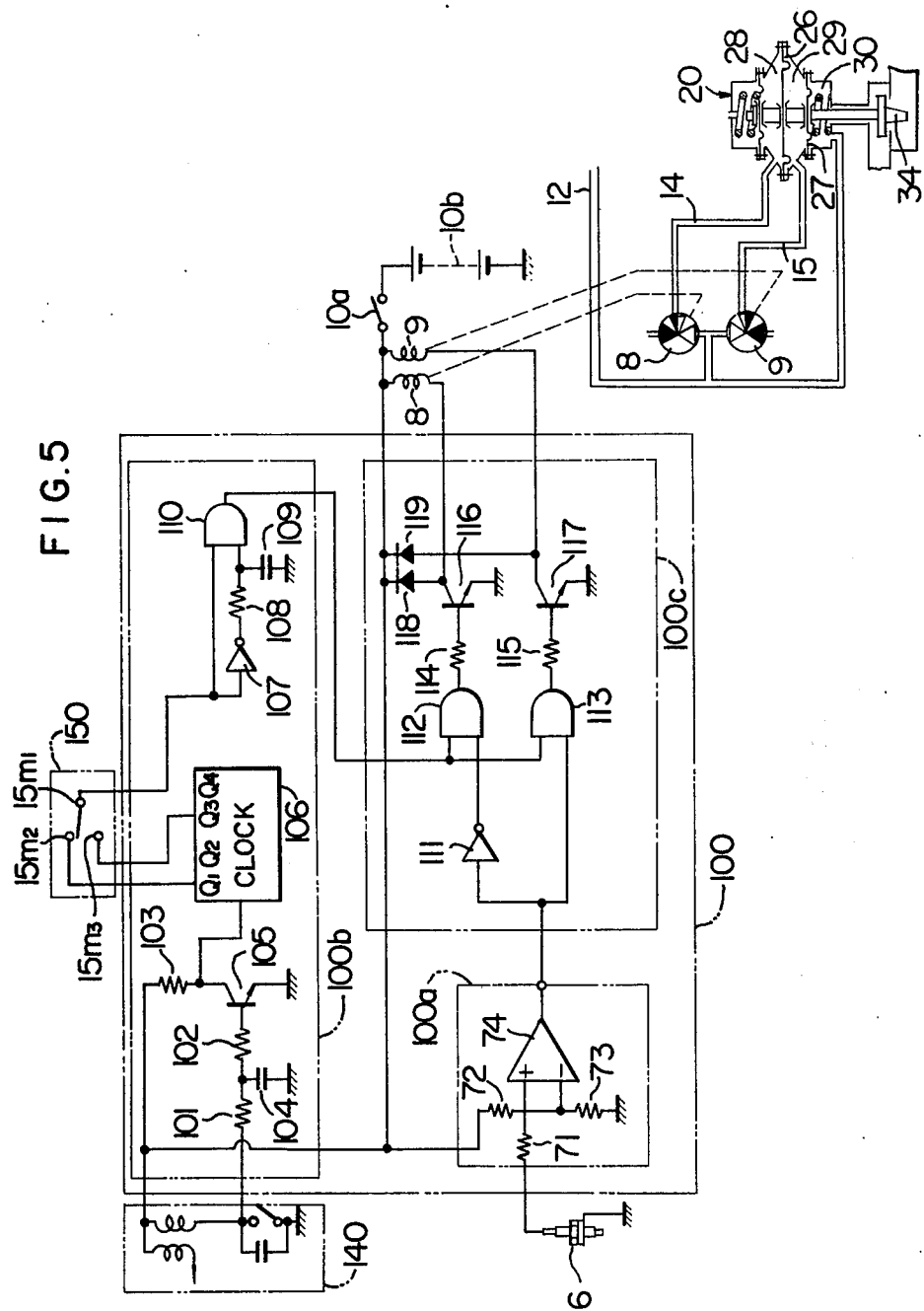
FIG. 5 is a schematic diagram showing the principal parts of another embodiment of the invention.

While, in the above-described embodiment, the drive unit 20 is controlled only in response to the output signal of the gas detector 6, it is possible to control the drive unit 20 by taking into consideration other operating parameters of the engine, e.g., the number of revolutions of the engine crankshaft and the acceleration and deceleration of the engine and thereby satisfactorily control the air-to-fuel ratio throughout a wider range of the operating conditions of the engine. This is realized by the embodiment shown in FIGS. 5, 6 and 7, and the second embodiment will now be described with reference to FIGS. 5 to 7. In FIG. 5, a control unit 100 comprises a comparison circuit 100a of the same type as the first embodiment including resistors 71, 72 and 73 and an OP AMP 74, a timing pulse generating circuit 100b for generating timing pulses in accordance with the number of revolutions of the engine crankshaft and the acceleration or deceleration of the engine, and a switching circuit 100c for energizing and deenergizing the three-way electromagnetic valves 8 and 9. In this embodiment, the control unit 100, the three-way electromagnetic valves 8 and 9 and the pipes 12, 14 and 15 constitute the necessary regulator unit.

In the embodiment, the first and second pressure chambers 28 and 29 are normally communicated with the intake manifold 2, so that the intake manifold vacuum is normally introduced into both of the chambers 28 and 29 through the respective three-way electromagnetic valves 8 and 9, while the atmosphere is intermittently introduced into either the chamber 28 or 29 controlled by the control unit 100.

The timing pulse generating circuit 100b comprises a reshaping circuit including resistors 101, 102 and 103, a capacitor 104 and a transistor 105, a binary counter 106, and a monostable multivibrator including an inverter 107, a resistor 108, a capacitor 109 and an AND gate 110, and the switching circuit 100c comprises an inverter 111, AND gates 112 and 113, resistors 114 and 115, transistors 116 and 117 and back electromotive force absorbing diodes 118 and 119.

A speed detector 140 generates a signal in synchronism with the revolution of the crankshaft of the engine 3 or in accordance with the rotational speed of the engine 3, and in this embodiment the intermittent signal generated at the negative terminal of the primary winding of the ignition coil generally used as the ignition system of the engine 3. The output signal of the speed detector 140 is applied to the control unit 100. An acceleration/deceleration switch 150 is disposed in the intake manifold 2 and electrically turned on and off in response to variations in the intake manifold vacuum, that is, the switch 150 is turned on in response to z sudden change in the intake manifold vacuum which occurs for example during periods of acceleration and deceleration, and its output signal is applied to the control unit 100.

As shown in FIG. 6, the construction of the acceleration/deceleration switch 150 is of the diaphragm type. In the Figure, two chambers 15c and 15d are defined by a casing 15a and a diaphragm 15b, and the chambers are communicated with each other through an orifice 15e. Back springs $15f_1$ and $15f_2$ are respectively disposed in the chambers 15c and 15d to urge the diaphragm 15b, and the chamber 15c is communicated with the intake manifold 2. An electrically conductive shaft 15g is securely attached to the diaphragm 15b, and a contact 15h is formed at the forward end of the shaft 15g. A slide shaft 15i is positioned so as to always contact with the shaft 15g, and terminals 15j and 15k are positioned so as to contact with the shaft 15g at the predetermined positions thereof. A relay 15m is operated in response to the engagement and disengagement of the terminal 15g with the terminals 15j and 15k, so that when the terminals are connected a contact $15m_1$ engages with a contact $15m_2$, whereas when the terminals are disconnected the contact $15m_1$ engages with a contact $15m_3$. In this way, the position of the relay 15 is changed depending on whether the engine 3 is at the acceleration/deceleration operation.

The speed detector 140 and the acceleration/deceleration switch 150 constitute a delay time detecting unit for detecting the delay time between the time that the exhaust gas composition is changed in the engine 3 by the additional air and the time that the change is detected by the gas detector 6.

The intermittent signal from the speed detector 140 is reshaped by the reshaping circuit in the timing pulse generating circuit 100b, and the reshaped signal is then converted by the binary counter 106 into a pulse signal of a suitable frequency. The pulse signal is further converted into a pulse signal having a suitable time duration. The frequency dividing ratio of the binary counter 106 is changed from one to another by the acceleration/deceleration switch 150, and in this embodiment the setting of the binary counter 106 is such that the division ratio is 2 : 1 during the periods of acceleration and deceleration, and the division ratio is 8 : 1 during the periods of normal operation. Consequently, the output pulse of the monostable multivibrator has a period proportional to the engine rotational speed, and consequently the output pulse period during the periods of acceleration and deceleration is a about ¼ the period obtained during the periods of normal operation.

Next, the operation of the control unit 100 will be described with reference to FIG. 7. When the engine 3 is accelerated or decelerated as shown in (A) of FIG. 7, the output of the acceleration/deceleration switch 150 is changed in accordance with the waveform in (A) of FIG. 7. In response to the signals from the speed detector 140 and the acceleration/deceleration switch 150 the timing pulse generating circuit 100b generates the timing pulses shown in (B) of FIG. 7. In this case, during the time period from a time $t_1$ to $t_2$, that is, during the acceleration or deceleration period, the period of the timing pulses is practically about ¼ the period obtained under the steady state conditions, although this is dependent on the rotational speed of the engine 3. On the other hand, the signal from the gas detector 6 which is variable in response to variation in the air-to-fuel ratio of the mixture produced in the carburetor 1 is discriminated by the comparison circuit 100a which in turn generates an output as shown in (C) of FIG. 7.

When the mixture is rich as compared with the stoichiometric air-to-fuel ratio, the output of the OP AMP 74 goes to the "1" level and the AND gate 113 of the switching circuit 100c is opened, thus causing the transistor 117 to be turned on in response to each timing pulse and thereby causing the three-way electromagnetic valve 9 to be energized intermittently by a signal shown in (D) in FIG. 7. Consequently, the atmospheric pressure is introduced intermittntly into the second pressure chamber 29 of the drive unit 20, and the vacuum in the second pressure chamber 29 drops as shown in (F) in FIG. 7 (the absolute pressure increases). On the contrary, when the mixture is lean as compared with the stoichiometric air-to-fuel ratio, the three-way electromagnetic valve 8 is intermittently energized by a signal (E) in FIG. 7 so that the atmospheric pressure is introduced into the first pressure chamber 28 of the drive unit 20, and the vacuum in the first pressure chamber 28 drops as shown in (G) of FIG. 7. The input ports of the three-way electromagnetic valve 8 are connected in a manner reverse to that shown in FIG. 1.

Thus, each time a timing pulse is generated, the atmospheric pressure is introduced for a predetermined time into the second pressure chamber 29 when the mixture is relatively rich and into the first pressure chamber 28 when the mixture is relatively lean, with the result that the pressure difference between the first and second pressure chambers 28 and 29 changes as shown in (H) of FIG. 7, and the bypass valve 34 is opened and closed in accordance with the pressure difference, thus controlling the air-to-fuel ratio of the mixtures by means of additional air. In the description of this embodiment, the atmosphere is introduced either one of the first and second pressure chambers. However, it is apparent that a similar effect will be obtained by intermittently introducing the intake manifold vacuum, while the first and second chambers 28 and 29 are normally opened to the atmosphere.

As a result, during the low speed and load operation where the amount of air drawn into the engine 3 is small, the interval between the timing pulses is increased thus gradually compensating the opening of the bypass valve 34 through the drive unit 20, whereas during the high speed operation where the amount of intake air is large the period of timing pulses is decreased thus rapidly compensating the opening of the bypass valve 34. During the periods of acceleration and deceleration the opening of the bypass valve 34 is rapidly controlled owing to the action of the intake manifold vacuum introduced into the third pressure chamber 30 as well as the greatly decreased period of the timing pulses. As a result, both the amount and rate of compensation of additional air are controlled properly and the air-to-fuel ratio of the mixture is satisfactorily maintained at the stoichiometric air-to-fuel ratio. While, in the above-described embodiment, the period of timing pulses is changed during the periods of acceleration and deceleration, the similar effect may of course be obtained by changing the duty factor of timing pulses.

Further, the delay detecting unit may comprise such detectors which detect intake manifold vacuum, intake air amount, venturi vacuum, throttle opening, vehicle speed, etc., singly or in combination thereof.

What is claimed is:

1. An air-to-fuel ratio control system for internal combustion engines for adjusting the air-to-fuel ratio of a mixture by controlling the amount of additional air supplied through an additional air passage to an intake port of an engine, comprising:

gas detector means mounted in an exhaust manifold for detecting the composition of the exhaust gas and generating a detection signal indicative of the air-to-fuel ratio of a mixture;

control unit means for generating a control signal in response to said detection signal;

main drive means for driving an adjustment valve mounted in said additional air passage to adjust a passage area thereof, said driving means having first and second pressure chambers divided by a main diaphragm connected to said adjustment valve by means of a rod;

means for introducing vacuum in the intake port into at least one of said first and second pressure chambers in response to said control signal thereby to produce a pressure difference between said pressure chambers to drive said adjustment valve to increase or decrease the passage area;

auxillary drive means having a third pressure chamber and an auxiliary diaphragm connected to said rod for biasing the movement of said adjustment valve in a direction to decrease the passage area due to the intake port vacuum being introduced into said third pressure chamber, thereby to prevent the amount of additional air supplied to the engine being affected by variations in the intake port vacuum.

2. An air-to-fuel ratio control system according to claim 1, wherein said third pressure chamber of said auxiliary drive means is located adjacent to either one of said first and second pressure chambers and separated therefrom by said auxiliary diaphragm having a smaller area than said main diaphragm.

3. An air-to-fuel ratio control system according to claim 1 wherein said system further comprises:
- a speed detector for generating a signal indicative of the engine speed, and
- an acceleration/deceleration switch for generating a signal indicating whether the engine is in acceleration and deceleration conditions or in an normal operating condition, and wherein said control unit comprises:
- a comparison circuit connected to said gas detector means for comparing said detection signal with a predetermined level and producing a signal indicating the detected air-to-fuel ratio is larger or smaller than the stoichiometric ratio,
- a timing pulse generator connected to said speed detector and said acceleration/deceleration switch for generating a timing pulse having a period proportional to the engine speed and also varied depending on whether the engine is in the acceleration and deceleration conditions or in the normal operation condition, and
- a switching circuit connected to said comparison circuit and said timing pulse generator for generating said control signal to intermittently introduce said vacuum in the intake port into at least one of said first and second chambers depending on the operating conditions of the engine.

* * * * *